Jan. 10, 1928.  
F. C. COPELAND  
1,655,939  
PUMP AND TANK ASSEMBLY  
Filed Aug. 31, 1925
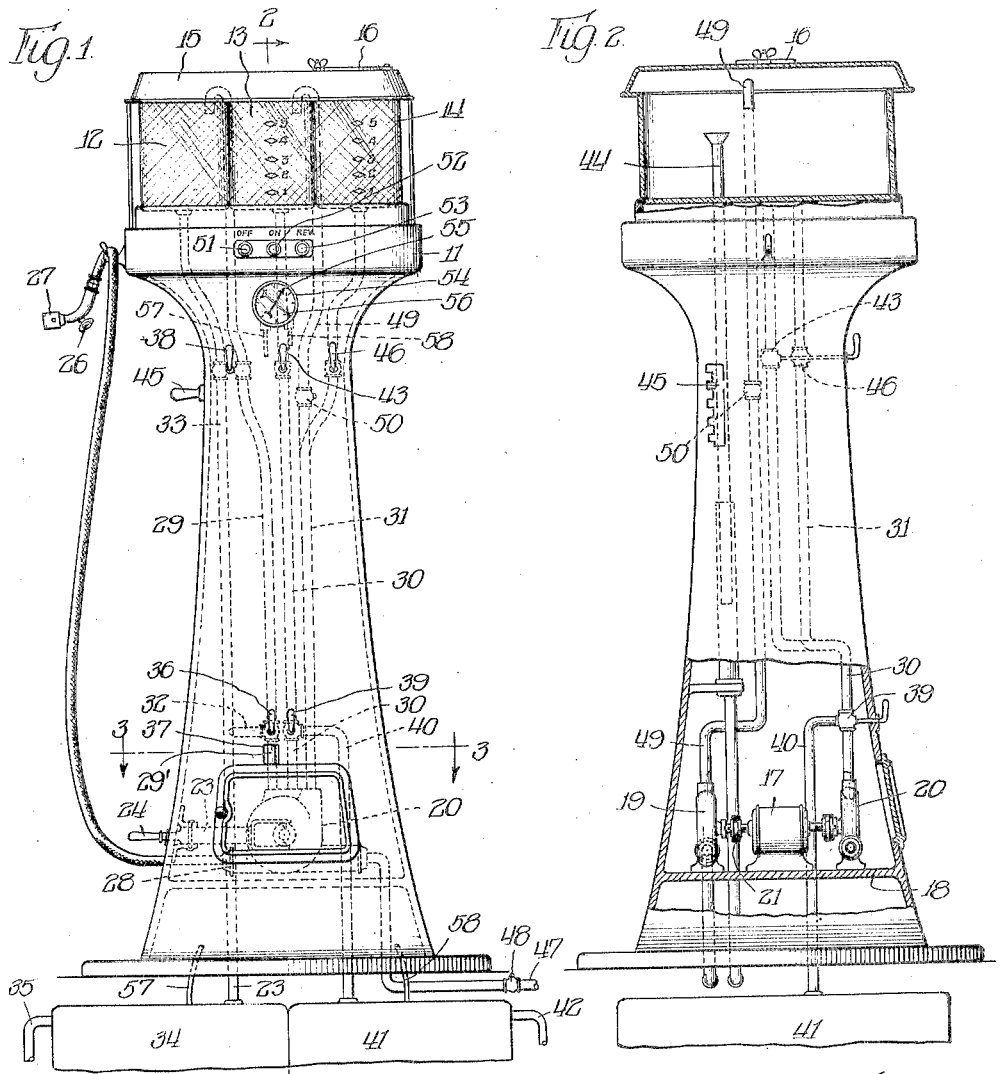
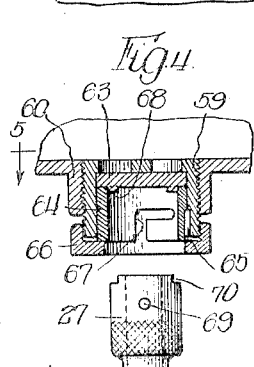
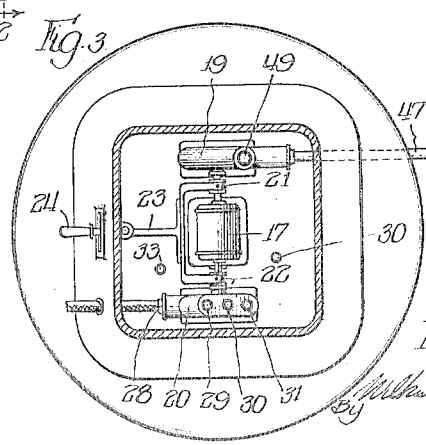
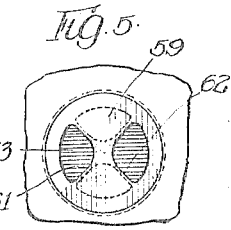
Witness:
R. Burkhardt
Inventor:
Francis C. Copeland Patented Jan. 10, 1928.

1,655,939

UNITED STATES PATENT OFFICE.

FRANCIS C. COPELAND, OF SAN FRANCISCO, CALIFORNIA.

PUMP AND TANK ASSEMBLY.

Application filed August 31, 1925. Serial No. 53,470.

This invention relates to a new and improved pump and more particularly, to a pump and tank assembly especially adapted to be used with motor vehicles for draining the crank cases and the like, flushing the cases and refilling them.

The different parts of motor vehicles, such as the crank case, the clutch casing, the transmission case and the rear end or differential casing require that the lubricant contained therein be withdrawn at stated intervals, that the casings be cleaned out and new lubricant put in. It has been the custom heretofore to do this work by opening ports in the bottoms of the casings and allowing the lubricant to run out by gravity. Distillate or other flushing oil is then poured in and allowed to run out by gravity in the endeavor to clean the contained mechanism and the interior of the casing. This method of procedure takes considerable time and labor and does not result in a proper cleansing of the parts.

It is an object of the present invention to provide a new and improved pump assembly whereby crank cases or the like may be drained, flushed and refilled.

It is a further object to provide a construction of this character in which the liquids in the casings may be drawn out under suction and the flushing fluid forced in under pressure, if desired.

It is an additional object to provide a construction of this character adapted to carry out the complete sequence of operations by the manipulation of simple control elements.

It is a further object to provide a construction which is compact and relatively simple in design and construction, so as to adapt it for rapid commercial production and use.

Other and further objects will appear as the description proceeds.

I have shown one preferred form of my invention in the accompanying drawings, in which Figure 1 is a front view of the assembly;

Figure 2 is a view of Figure 1 as seen from the left with parts being broken away to more clearly disclose the interior construction;

Figure 3 is a horizontal section taken on line 3—3 of Figure 1;

Figure 4 is a fragmentary section showing the casing fitting and the co-acting nozzle, and Figure 5 is a view taken on line 5—5 of Figure 4.

In the form shown, the apparatus comprises the housing member 11, which supports a series of three tanks 12, 13 and 14. The tanks are covered by a cover member 15 which is provided with an opening over tank 14, covered by the closure 16. The motor 17 is located on the partition 18 in the base of the housing and has associated with it the pumps 19 and 20. The connection between the motor 17 and the pumps is made by means of the clutches 21 and 22 which are operated by the single clutch fork 23 controlled by clutch lever 24. The hose 25 is provided with the valve 26 and the connection fitting 27. This hose is connected at 28 to the pump 20. Three pipes 29, 30 and 31 extend upwardly from the discharge end of the pump 20. The pipe 29 is cross connected by pipe 32 with the discharge pipe 33. This pipe 33 at its upper end leads from the bottom of the tank 12 and its lower end leads into the tank 34. The tank 34 is provided with an overflow opening 35. The point of connection between pipes 29 and 32 is controlled by the two way valve 36 which may be moved to open into either the upper portion of pipe 29 or the cross connection 32. The lower portion 29' of pipe 29 is preferably formed of glass, so that the flow through it may be observed and for this purpose, an opening or window 37 is shown as formed in the housing 11. The upper portion of the pipes 29 and 33 is controlled by a double valve 38. There is no cross communication between the pipes at this point, but with this valve 38 drawn to the right, pipe 29 is opened and pipe 33 closed and with it drawn to the left, pipe 33 is opened and pipe 29 closed.

The pipe 30 is connected by means of the two way valve 39 with the pipe 40 which leads to tank 41. Tank 41 is provided with an overflow opening 42. The upper portion of pipe 30 is controlled by valve 43 and its upper end leads into tank 13. Tank 13 is provided with an adjustable overflow pipe 44 adjusted by means of handle 45 to bring it to the desired height which is indicated on the glass wall of the tank. Pipe 31 leads into the bottom of tank 14 and is controlled by valve 46.

The pump 19 is provided with intake pipe 47 controlled by a check valve 48 and the discharge pipe 49 controlled by check valve 50, discharges into the top of tank 13. The movement of the motor 17 is controlled by three buttons, or switches 51, 52 and 53, which respectively turn the motor off, on and reverse it. The gauge 54 provided with the two hands 55 and 56 is connected to the tank 34 by pipe 57 and to tank 41 by pipe 58. The hands show the height of the contents of the two tanks.

The form of fitting shown in Figures 4 and 5 consists of a shell 59 which is threaded into the opening in the lower portion of the crank case or the like 60. The upper portion of the member 59 is provided with the two openings 61 and 62, as shown in Figure 5. The closure member 63 is retained adjacent the upper portion of the member 59 by the sleeve 64 which is held against rotation by the key 65 and which is held in place by the collar 66. The sleeve 64 is provided with the bayonet slot grooves 67. The bottom of the closure member 63 is provided with the lugs 68. The fitting 27 on the end of the hose is provided with the pins 69 adapted to cooperate with the bayonet slots 67 and with the notches 70 adapted to co-act with the lugs 68.

When the fitting 27 is forced upwardly in the casing fitting, as the pin 69 reaches the top of the vertical portion of the bayonet slots, the notches 70 engage the lugs 68. When the fitting is rotated to move the pin 69 to the limit of the horizontal portions of the bayonet slots, the notches 70, by their engagement with the lugs 68 serve to rotate the closure 63 and bring openings in it into registration with the openings 61 and 62. Material may then flow into or out of the casing through the hose. The removal of the fitting 27 serves to close the opening in the casing. The tight fit between the closure 63 and the member 59 may be maintained by adjustment of the sleeve 64 by means of the collar 66.

In the use of the apparatus, the first operation consists in draining from the desired casing the dirty oil or lubricant. The pump and tank assembly will ordinarily be first prepared for the operation by placing in the tank 14 the desired amount of fresh lubricant by opening the closure 16. It will be understood that this method of filling this particular tank is illustrative only and it may be filled by flow from a pipe line under pressure or in any desired manner. The tank 13 is filled to the desired height with distillate or any preferred liquid to be used by flushing out the case being drained and cleaned. The overflow pipe 44 is adjusted by means of handle 45 to bring it to the desired height in the tank which can be observed through the glass wall of the tank.

The fluid is pumped into the tank 13 by means of pump 19 which is placed in operation by proper adjustment of clutch 22 by means of the clutch lever 24. The motor is started by pressing on the switch 52. The fluid is drawn through the intake pipe 47 and passes up though the discharge pipe 49 into the top of the tank 13. The valve 43 in pipe 30 is closed to prevent the fluid flowing from the tank until desired.

The fitting 27 is then connected to the opening in the casing by means of the bayonet slot connection and this serves to open communication between the casing and the hose as has been described. The pump 20 is connected to the motor by means of proper operation of the clutch lever 24. If it is desired to draw the dirty lubricant into tank 12, the valve 36 is turned to permit the pipe 29 to feed into the tank. The valve 38 is also placed so as to put the pipe 29 into communication with the tank. The motor is started by pressing on the proper button and all of the lubricant in the casing is drawn by suction through the hose and pump and forced up through pipe 29 into the tank 12. In the tank, the condition and quantity of the lubricant may be observed through the glass walls of the container. The dirty lubricant may then be discharged into the tank 34 by throwing the valve 38 to the left which closes pipe 29 and opens pipe 33 which permits the lubricant to flow by gravity into the tank 34.

The next operation consists in flushing the casing with the flushing liquid contained in tank 13. This is accomplished by opening the valve 43 which permits the liquid to flow down from pipe 30 to the pump 20. The pump is put in operation and draws the liquid from the tank and throws it under pressure into the casing. While the flushing liquid is in the casing, the motor and gears of the vehicle being worked upon are preferably given a few revolutions by means of the crank or starter.

The pump motor 20 is next put in operation in the reverse direction and the flushing liquid is drawn out under suction from the casing. When the flushing liquid is drawn from the casing it may be sent direct to the tank 41 by means of pipe 40. This is accomplished by turning the two way valve 39 to connect the pipe 30 directly with the pipe 40 and tank.

The final operation in the series consists in refilling the casing with clean, new lubricant. This is done by opening the valve 46 in pipe 31 which permits the lubricant to flow by gravity from tank 14 to the pump 20. The pump is put in operation and throws the lubricant into the casing through the hose. This completes the operation and the hose is disconnected by turning the fitting 27. This disconnection automatically closes the opening in the bottom of the casing and no fluid is lost. If it is desired, the hose may be disconnected from the drain opening in the case before the new lubricant is fed in and it may be fed in from the hose through the breather pipe or other upper lubricant supply opening.

If desired, the dirty lubricant may be drawn directly from the casing into the tank 34 without passing into the tank 12. This is accomplished by turning the valve 36 so as to connect the lower portion of pipe 29 with the cross connection 32. The lubricant then flows across this connection and down pipe 33 to the tank 34. The flow of lubricant may be observed through the opening or window 27 and the glass pipe or tube 29'.

The level of the dirty lubricant and dirty flushing liquid in the tanks 34 and 41 can be observed from the indicator 54 and these tanks drained at proper intervals. The dirty liquids may then be cleaned and reclaimed for other uses.

It is obvious that the details of the structure may be varied materially to accomplish the desired results and it is to be understood that the specific showing is by way of illustration only. I contemplate such changes and modifications as come within the spirit and scope of the appended claims.

I claim:

1. In combination, a housing, supply tanks supported thereby, a pump in said housing, waste tanks below the housing, valve controlled piping whereby the pump may be selectively connected to the supply or waste tanks, and a hose connected to the pump extending from the housing.

2. In combination, a plurality of visible tanks, a housing supporting said tanks, a pump in said housing, waste tanks located below said housing, and piping connecting the pump and visible and waste tanks.

3. In combination, a plurality of visible tanks, a housing supporting said tanks, a motor and a plurality of pumps in said housing, means whereby the motor may be selectively connected to the pumps and means whereby each pump may be selectively connected to certain of the tanks.

4. In combination, a plurality of visible tanks, a housing supporting said tanks, a motor and a plurality of pumps in said housing, waste tanks located below said housing, means whereby the motor may be selectively connected to the pumps and means whereby each pump may be selectively connected to certain of the tanks.

5. In combination, a plurality of visible tanks, a housing supporting said tanks, waste tanks located below said housing, a motor and a pair of pumps in said housing, piping connecting each of said pumps and a plurality of tanks, clutch mechanism adapted to selectively connect the motor to either of said pumps, and valves controlling said piping, the valves and clutch having operating levers extending exteriorly of the casing.

Signed at Chicago, Illinois, this 28th day of August, 1925.

FRANCIS C. COPELAND.